March 12, 1929.  H. E. BREY  1,704,963
BRAKE LINING
Filed Dec. 29, 1926
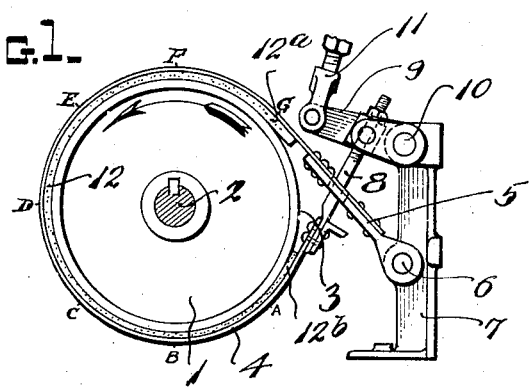
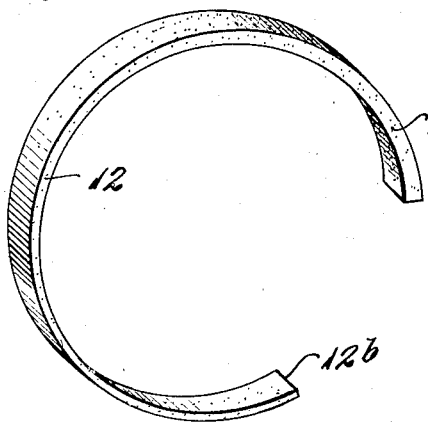
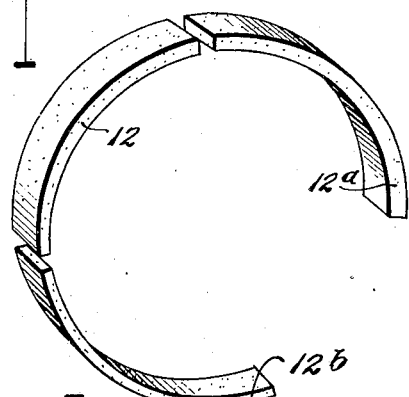
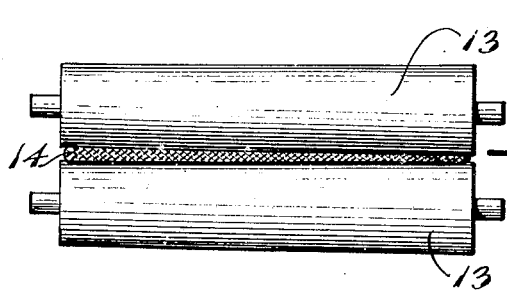
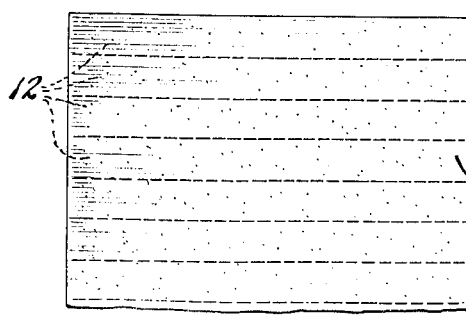
Inventor
H. E. Brey
By Robb & Robb
Attorneys.

Patented Mar. 12, 1929.

1,704,963

UNITED STATES PATENT OFFICE.

HAROLD E. BREY, OF MILWAUKEE, WISCONSIN, ASSIGNOR TO KOEHRING COMPANY, OF MILWAUKEE, WISCONSIN.

BRAKE LINING.

Application filed December 29, 1926. Serial No. 157,758.

The present invention appertains to improvements in clutch or brake bands and methods of producing the same. In particular, it relates to those braking and clutching instrumentalities, whether in the form of a band per se or a band lining, of the flexible type which are adapted to embrace or partially embrace the braking or clutch surface.

Since there is little difference between the construction and operation of brake and clutch bands, it is to be understood that these terms are used herein interchangeably.

It is quite generally known that the wear upon a flexible brake member, which is applied to a rotating surface, is not uniform in character, due perhaps to the manner in which it is desirable to mount the member with relation to the friction surface, and the fact that the pressure is applied from one end by a movement in a circumferential direction which tends actually to straighten out the band. As an exemplification only of the principle involved, the automobile brake may be mentioned. One end of the brake band encircling the drum, the dead end, is fixed, while the opposite end, the live end, is operatively connected to the braking lever, movement of which tends to clamp the band about the drum, producing friction upon the drum. The pressure is exerted in a radial direction, but there is a still further action which is produced by the rotation of the drum and the friction of the band mentioned due to the drag of the brake drum which tends to move the band around with it. The result of these two stresses is to cause a materially greater wear due to cumulative friction and greater pressure on the dead or fixed end of the band than on the other. In fact, it is common to find brake linings, when discarded, with little appreciable wear at the live end of the brake, while at the other end the lining is completely destroyed. To entirely eliminate this condition would necessitate adjustments of the bands which would produce an undesirable distortion of the brake and lack of uniform pressure upon the braking surface.

The primary object of this invention is to provide a type of brake or clutch member which, however, will take care of the condition referred to and materially prolong the life and efficiency of the band. To that end, the brake member is formed with a greater thickness at the dead end than at the opposite, preferably by a uniform tapering formation from minimum thickness to maximum.

A further object resides in the formation of such a friction-producing member by a novel method where the material employed is moldable or plastic in character.

In the drawings,—

Figure 1 is a side elevation of a clutch or brake device, involving my special form of friction band.

Figure 2 is a perspective of the band lining.

Figure 3 is a similar view of a modified or segmental form of band lining.

Figure 4 is a diagrammatic showing of the manner in which the band member may be formed by my special method, and Figure 5 is a plan view of a sheet of material from which the individual friction strips may be cut after rolling out into sheet form of proper thickness.

Similar reference characters refer to like parts in all figures of the drawing.

It is to be understood that while the friction-producing band, which is hereinafter described, is in the nature of a lining strip to be used in conjunction with a metallic supporting band, I do not wish to be limited to such form, as this is more or less controlled by the purposes for which the friction device is employed and the strength characteristics of the material of which the friction band is composed.

In the drawing, I have shown my invention as particularly devised to serve as a clutch band which is arranged to encircle a rotating member or drum 1, mounted upon the axis 2, and having a flat, clutching surface 3. The friction-producing means consists of a metallic strip 4, which, at the dead end, is fixedly secured to the connector piece 5, said connection piece having an opening therein that engages the stud 6, which is carried by a suitable support 7, in this instance a part of the frame of the apparatus. At the live end, the strap is connected to the adjustable connector 8, which passes through the opening in the piece 5 and extends upwardly to a lever arm 9, which is pivoted at 10 to the aforementioned support. The arm 9 has pivotally connected thereto an actuator 11 of any desired form, and by means of which the band may be operated to produce more or less friction on the drum 1.

To the metal strap 4 is attached, in any desired manner, the friction material or lining member 12, shown specifically in Figure 2 of the drawing. This member, it will be observed, has a greater thickness at the end $12^a$ than at the other end $12^b$. Preferably, the thickness tapers off uniformly from the maximum thickness at one end to the minimum at the other, where full advantage is to be taken of the complete friction surface of the drum 1, though it is clear that the member may be segmental in form with each segmental part of a uniform thickness. The segmental form of the lining member is shown in Figure 3, but here each segment is proportionately tapered to correspond to the integral form in Figure 2. A friction member, such as above described, will obviously have no greater total area of friction surface than the standard uniform lining, but will have twice the life of the same being substantially twice as thick as the ordinary lining at the point of greatest wear.

In the operation of a brake or clutch device of the character described, the actuator means 11 is shifted to cause the arm 9 to draw upon the band in the usual manner, tending to clamp it upon the friction surface of the drum and producing pressure in a radial direction. As hereinbefore premised, as this stress is applied, the drum tends to drag the friction member around with it and sets up a materially increased pressure at the support or dead end of the band, due to the increase in the coefficient of friction; that is to say, at the point A of the band shown in Figure 1, the pressure is minimum and gradually increases at points B, C, D, etc., toward the point G, as the thickness of the band proportionately increases. Necessarily, the greater wear is produced at the point G, and by making the thickness of the band at this end greater, the life of the bands will be materially increased and their braking efficiency likewise enhanced.

The lining member may be of any desired material well known in the manufacture of such at the present time. Where the material employed is composition material of a plastic character, my novel process of forming the same may be employed. This process is diagrammatically shown in Figure 4 of the drawing wherein I utilize two oppositely tapering pressing rollers 13 between which the material in plastic condition is rolled out into a sheet 14, as shown in Figure 5, which may be subsequently cut into narrow strips or bands of standard widths, as indicated in dotted lines in said figure. Naturally these rollers 13 would be equal in length to the length of band desired. The material, as shown in Figure 4, will have the tapering form. The same formation may be produced by molding the material in a well known manner. Under the conditions, I do not wish to be limited in respect to the method to be employed in producing the particular form of band or lining member used in conjunction with these friction-producing devices.

It is notable that the brake lining of this invention may be made with substantially the same amount of material as used in ordinary brake linings, especially when molded, under which conditions, the invention involves a redistribution of the amount of material ordinarily used.

What I claim is:—

1. A friction member of the class described comprising a flexible strip composed of a plurality of segments, each tapering from one end toward the other uniformly to provide a maximum wear receiving portion.

2. A clutch or brake device of the class described comprising a flexible strap connected at one end to a support and at its other end to actuating means, and a lining member connected thereto and having a greater thickness at the end connected to the support than at the other.

3. A clutch or brake device of the class described comprising a flexible band connected fixedly at one end to a support, actuating means connected to the other end and intersecting the first-mentioned end, and a drum having a friction surface encircled by said band, the band being thicker at the dead end than at the live end.

4. A friction member for use with brake mechanism, consisting of a band of flexible material having a uniform friction surface but of a greater thickness at the maximum wear receiving end portion than at the minimum wear receiving portion.

5. A friction member for brake mechanism of the class described, consisting of a band of flexible material having a uniform friction surface and having a maximum thickness at the maximum wear receiving portion, said band gradually tapering in the direction of rotation of the member to which the band is to be applied, to a minimum thickness at the minimum wear receiving portion.

In testimony whereof I affix my signature.

HAROLD E. BREY.